United States Patent
Poirier et al.

(10) Patent No.: US 6,970,920 B2
(45) Date of Patent: Nov. 29, 2005

(54) METHODS, SYSTEMS AND COMPUTER PROGRAM PRODUCTS FOR COMMUNICATING WITH UNCONFIGURED NETWORK DEVICES ON REMOTE NETWORKS

(75) Inventors: Daniel Earl Poirier, Durham, NC (US); Barton Clark Vashaw, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 09/832,543

(22) Filed: Apr. 11, 2001

(65) Prior Publication Data

US 2002/0156898 A1 Oct. 24, 2002

(51) Int. Cl.[7] ........................................... G06F 15/177
(52) U.S. Cl. .................. 709/220; 709/217; 709/218; 709/225; 709/228; 709/249
(58) Field of Search .............................. 709/217, 218, 709/225, 228, 249, 220

(56) References Cited

U.S. PATENT DOCUMENTS 6,018,771 A * 1/2000 Hayden ...................... 709/231
6,377,990 B1 * 4/2002 Slemmer et al. ............ 709/225
2001/0054101 A1 * 12/2001 Wilson ....................... 709/225
2002/0009078 A1 * 1/2002 Wilson et al. .............. 370/389

OTHER PUBLICATIONS

U.S. Appl. No. 09/451,950, entitled *Method and System for Configuring Transmission Control Protocol/Internet Protocol Address of a Computer With or Without Keyboard, Mouse of Display*, filed Nov. 30, 1999.

* cited by examiner

Primary Examiner—Kim Huynh
Assistant Examiner—Mohammad O. Farooq
(74) Attorney, Agent, or Firm—Myers Bigel Sibley & Sajovec, P.A.

(57) ABSTRACT

Methods, system and computer program products for establishing a connection to a network device which does not have an assigned network address. A connection is established from a configuring device to the network device utilizing an unassigned network address for the network to which the network device is attached irrespective of whether the network device is attached to a network local to or remote from the configuring device. The network device may be configured utilizing the established connection. A network address may also be assigned to the device irrespective of whether the network device is attached to a network local to or remote from the configuring device.

17 Claims, 7 Drawing Sheets

| Ethernet headers | Hardware Type | Protocol Type | Operation | Sender Ethernet Address | Sender IP Address | Target Ethernet Address | Target IP Address |
|---|---|---|---|---|---|---|---|

METHODS, SYSTEMS AND COMPUTER PROGRAM PRODUCTS FOR COMMUNICATING WITH UNCONFIGURED NETWORK DEVICES ON REMOTE NETWORKS

FIELD OF THE INVENTION

The present invention relates to network devices and more particularly to the configuration of network devices.

BACKGROUND OF THE INVENTION

Increases in the use of computer networks, and in particular, the use of networks based on the Internet Protocol (IP), have led to a proliferation of network devices. Such network devices may take many forms, including, for example, network workstations, network servers, network appliances, network attached storage devices, routers, bridges and the like. With such a proliferation of network devices, the complexity of configuring such devices may also increase. Configuration of such devices may be further complicated by the devices having limited input/output capabilities. For example, certain network devices may not have inputs for a keyboard or a mouse or an output for a display or may be used without some or all of such input/output devices. Devices with limited input capabilities or which are intended to be used without user interface input and/or output devices are often called "headless" devices.

One difficulty with headless devices is configuring the devices to communicate over a network. For example, it may be difficult to provide an initial IP address for the devices to allow communication on the network. Conventional techniques for configuring a headless network device have included attaching input and/or output devices to the network device, using specialized software on another device on the same physical network or by running specialized configuration software on another device on the same physical network which allows for communication with the unconfigured device. Such efforts may, however, be cumbersome or even involve configuring each device by manual manipulation of the device. Furthermore, such configuration methods may be limited in allowing configuration across networks.

One configuration technique which has been utilized across multiple networks is Dynamic Host Configuration Protocol (DHCP). DHCP, typically, utilizes a relay agent on a router to overcome configuration issues across networks. However, use of such an agent may require a change at each router. These changes may become complex and burdensome.

SUMMARY OF THE INVENTION

Embodiments of the present invention provide methods, systems and computer program products for establishing a connection to a network device where the network device does not have an assigned network address. A connection is established from a configuring device to the network device utilizing an unassigned network address for a network to which the network device is attached irrespective of whether the network device is attached to a network local to or remote from a configuring device. The network device may be configured utilizing the established connection.

In further embodiments of the present invention, establishing a connection to the network device may be accomplished by sending a connection request to a network address from a configuring device onto a network local to the configuring device. The connection request is routed from the network local to the configuring device to a network local to the network device and remote from the configuring device. An Address Resolution Protocol (ARP) message is sent on the remote network. The network device responds to the ARP message and evaluates the received ARP message to determine a source address for the ARP message. A default routing path for messages to networks other than the remote network is set to the source address of the ARP message. The connection request is received by the network device and responded to using the default routing path so as to establish the connection utilizing the network address.

In still further embodiments of the present invention, responding to the ARP message is preceded by determining if another device attached to the remote network has responded to the ARP message. Furthermore, responding to the ARP message, setting a default routing path, receiving the connection request and responding to the connection request are carried out if another device has not responded to the ARP message. Additionally, determining if another device attached to the remote network has responded to the ARP message may be provided by monitoring the remote network for ARP message responses from other devices on the remote network. Determining if another device attached to the remote network has responded to the ARP message may be provided by sending a second ARP message identifying the network address onto the remote network and determining if a response to the second ARP message is received.

In yet additional embodiments of the present invention, the received connection request is evaluated to determine if the received connection request is to a predetermined port. In such embodiments, responding to the connection request is not carried out if the connection request is not to the predetermined port.

In further embodiments of the present invention, configuring the network device includes replacing the default routing path to the source address of the ARP message with user configured routing paths. Configuring the network device may also include assigning a network address to the network device which is different from the network address of the connection.

In particular embodiments of the present invention, the network address specified for the connection is an Internet Protocol address and the connection comprises a Transmission Control Protocol connection. Furthermore, the network device may be a headless network device.

In further embodiments of the present invention, methods, systems and computer program products are provided for assigning a network address to a network device which does not have an assigned network address. An Address Resolution Protocol (ARP) message is received at the network device. The network device determines if the received ARP message is associated with an unassigned network address. The network device responds to the received ARP message so as to assume ownership of the unassigned network address to provide a network address for the network device. The network device also sets a default routing path of the network device to a source address of the received ARP message such that communications to devices which are in a network remote from the network associated with the network device are sent to the source address.

In additional embodiments of the present invention, a connection request from a configuring device to the assumed network address of the network device and to a predefined port is received. The connection request is responded to utilizing the default routing path so as to establish a connection from the configuring device to the network device. The network device may be configured utilizing the established connection. Such configuration of the network device may include assigning a new network address to the network device to replace the assumed network address. Such configuration may also include providing updated routing information to the network device to replace the default routing path of the network device.

In still further embodiments of the present invention, determining if the received ARP message is associated with an unassigned network address may be provided by sending an ARP message from the network device which identifies a network address associated with the received ARP message. It is determined that the received message is associated with an unassigned network address if a response to the ARP message from the network device is not received within a predefined time period.

In particular embodiments of the present invention, the network address is an Internet Protocol address and the ARP message is an ARP request. In such embodiments, setting a default routing path of the network device to a source address of the received ARP message such that communications to devices which are in a network remote from the network associated with the network device are sent to the source address of the received ARP message may be provided by setting the default routing path for destination devices associated with an IP subnet which is different from an IP subnet associated with the network device to a sender IP address of the ARP request received by the network device.

As will further be appreciated by those of skill in the art, while described above primarily with reference to method aspects, the present invention may be embodied as methods, apparatus/systems and/or computer program products.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. As will be appreciated by those of skill in the art, embodiments of the present invention may provide for the configuration of a "headless" network device irrespective of the location of the headless network device. As used herein, a headless network device refers to a network attached device which does not necessarily include conventional input devices, such as a keyboard and mouse and/or may not include conventional output devices such as a display. Examples of headless network devices may include, but are not limited to, network attached storage, routers, Internet appliances, such a picoservers, or other network appliances.

Methods and systems for configuring headless network devices on the same physical network are described in commonly assigned U.S. patent application Ser. No. 09/451,950, entitled "METHOD AND SYSTEM FOR CONFIGURING TRANSMISSION CONTROL PROTOCOL/INTERNET PROTOCOL ADDRESS OF A COMPUTER WITH OR WITHOUT KEYBOARD, MOUSE OR DISPLAY" which was filed Nov. 30, 1999, the disclosure of which is incorporated herein by reference as if set forth fully herein. Such systems, however, are described as only assigning an Internet Protocol (IP) address to a headless network device on the same physical network.

As described herein, according to embodiments of the present invention, an unconfigured network device monitors a network for ARP messages on the network devices local network that go unanswered and attempts to assume the target address of the unanswered messages An initial network request may be redirected to the unconfigured network device and configuration information, such as a configuration web page, may be provided in response to the initial request. However, because the unconfigured network device does not have routing information, the unconfigured network device does not know how to reach devices which it cannot respond to directly. Accordingly, the unconfigured network device also establishes a default routing path based on the ARP messages so as to allow it to respond to requests made across networks.

Such a default routing path may be utilized because, if the configuring device is on the same network as the unconfigured device, the ARP message will have as a source address the address of the configuring device. Setting the default routing path to the address of the configuring device still results in the response to the initial request being provided to the configuring device. The routing information may then be corrected as the unconfigured device may be configured by replacing the default routing path with a correct default routing path.

Similarly, even if multiple routers are provided on the network associated with the unconfigured network device, because the ARP message is generated by the router receiving the connection request, a path to the source of the connection request is present. Thus, even if the path is not the most efficient, a response routed to the source of the ARP message should ultimately reach the source of the connection request. Furthermore, even if asymmetric routing is provided such that a path from a device into a network is different from a path to the device out of the network, sending the response to the connection request to the source of the ARP message should result in the router either forwarding the response and sending a redirect message or merely sending a redirect message, such as an Internet Control Message Protocol (ICMP) redirect message. If the response is not forwarded, the unconfigured device could send the response to the destination indicated in the redirect message and, thereby, provide the response to the configuring device.

Figure 1:
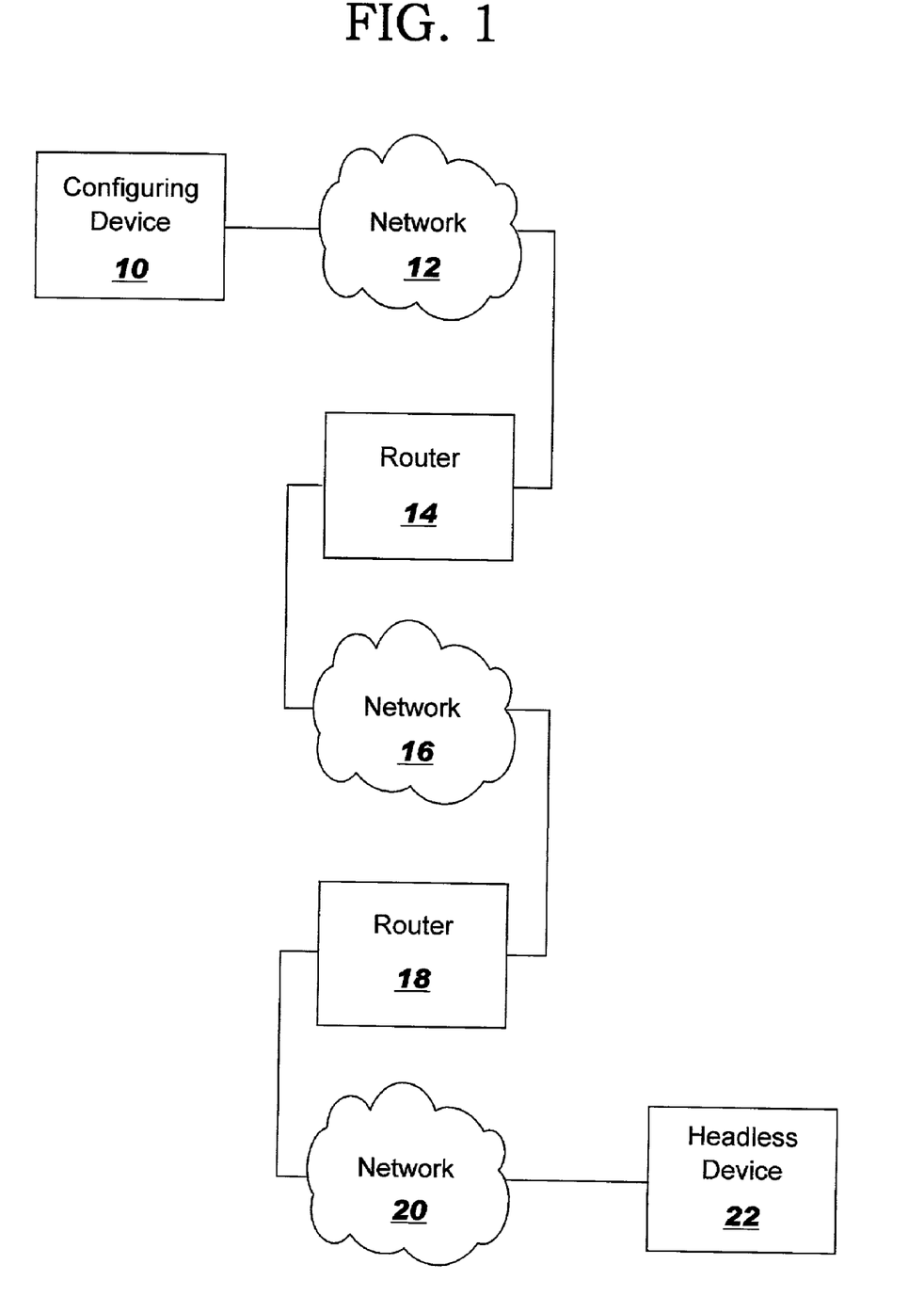
FIG. 1 is a block diagram illustrating a system incorporating embodiments of the present invention.

FIG. 1 illustrates a network configuration having a headless network device in which embodiments of the present invention may be incorporated. As seen in FIG. 1, a configuring device 10, such as a data processing system executing an instance of a web browser or other such network communications application, such as telnet or the like, may be provided. The configuring device 10 may be connected to a local network 12, which may be connected, through, for example, a router 14, to a remote network 16. Similarly, the remote network 16 may be connected to a second remote network 20 through, for example, the router 18. A headless network device 22 is illustrated as attached to the second remote network 20.

Devices attached to a network are considered on a local network if the configuring device 10 may communicate directly with the network attached device such that the packets transmitted between the configuring device 10 and the network attached device are not routed by a routing layer protocol or higher. A network may be considered a remote network to the configuring device 10 if packets transmitted to a network attached device on the network must be routed by a routing layer protocol or higher. Thus, for example, devices on the same IP subnet as the configuring device 10 may be considered on a local network and devices on a different IP subnet from the IP subnet of the configuring device may be considered on a remote network. Similarly, a device may be considered on a local network if the device may be reached in one hop, whereas the device may be considered on a remote network if two or more hops are required to reach the device.

Figure 2A:
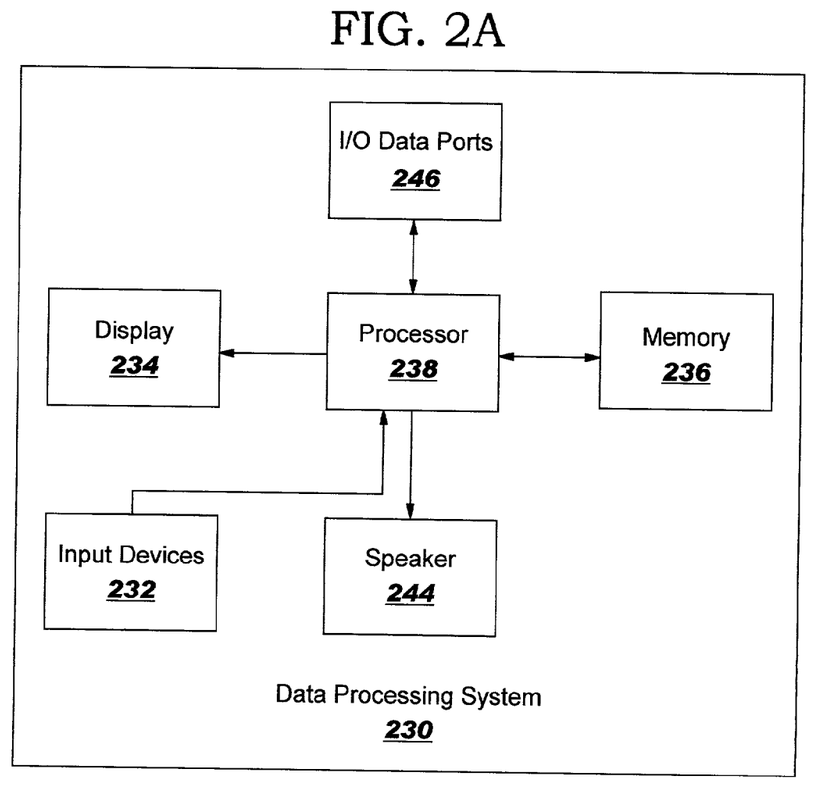
FIG. 2A is a block diagram of a data processing system suitable for use as a browser data processing system according to embodiments of the present invention.

FIG. 2A illustrates an exemplary embodiment of a data processing system 230 suitable for providing a configuring device 10 in accordance with embodiments of the present invention. The data processing system 230 typically includes input device(s) 232 such as a keyboard or keypad, a display 234, and a memory 236 that communicate with a processor 238. The data processing system 230 may further include a speaker 244, and an I/O data port(s) 246 that also communicate with the processor 238. The I/O data ports 246 can be used to transfer information between the data processing system 230 and another computer system or a network. These components may be conventional components such as those used in many conventional data processing systems which may be configured to operate as described herein.

Figure 2B:
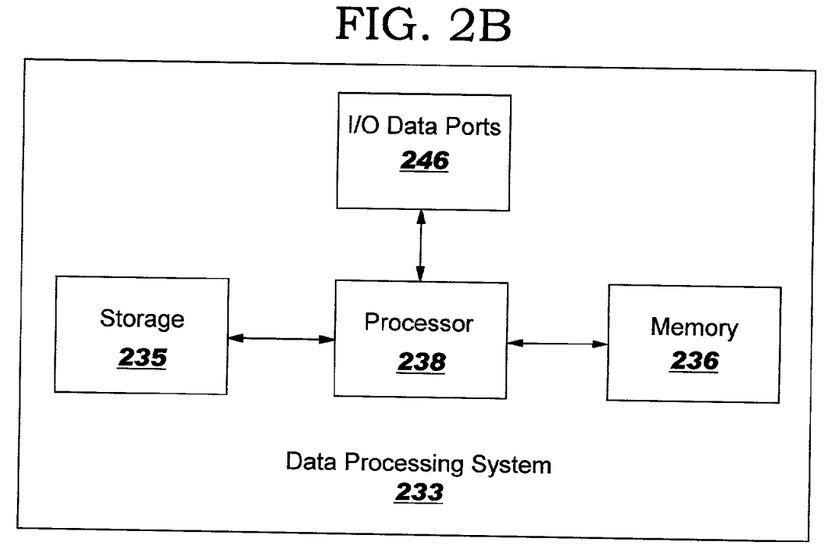
FIG. 2B is a block diagram of a headless data processing system suitable for use in embodiments of the present invention.

FIG. 2B illustrates an exemplary embodiment of a data processing system 233 which may be a headless network device 22 in accordance with embodiments of the present invention. The data processing system 233 typically includes a memory 236 that communicates with a processor 238 and an I/O data port(s) 246 that also communicate with the processor 238. The I/O data ports 246 can be used to transfer information between the data processing system 233 and another computer system, such as over a network, for example, using the Internet, a local area network (LAN), a wide area network (WAN) or an Intranet. The data processing system 233 may also include a storage device 235, such as a hard drive, optical drive or the like. These components may be conventional components such as those used in many conventional data processing systems which may be configured to operate as described herein.

Figure 3:
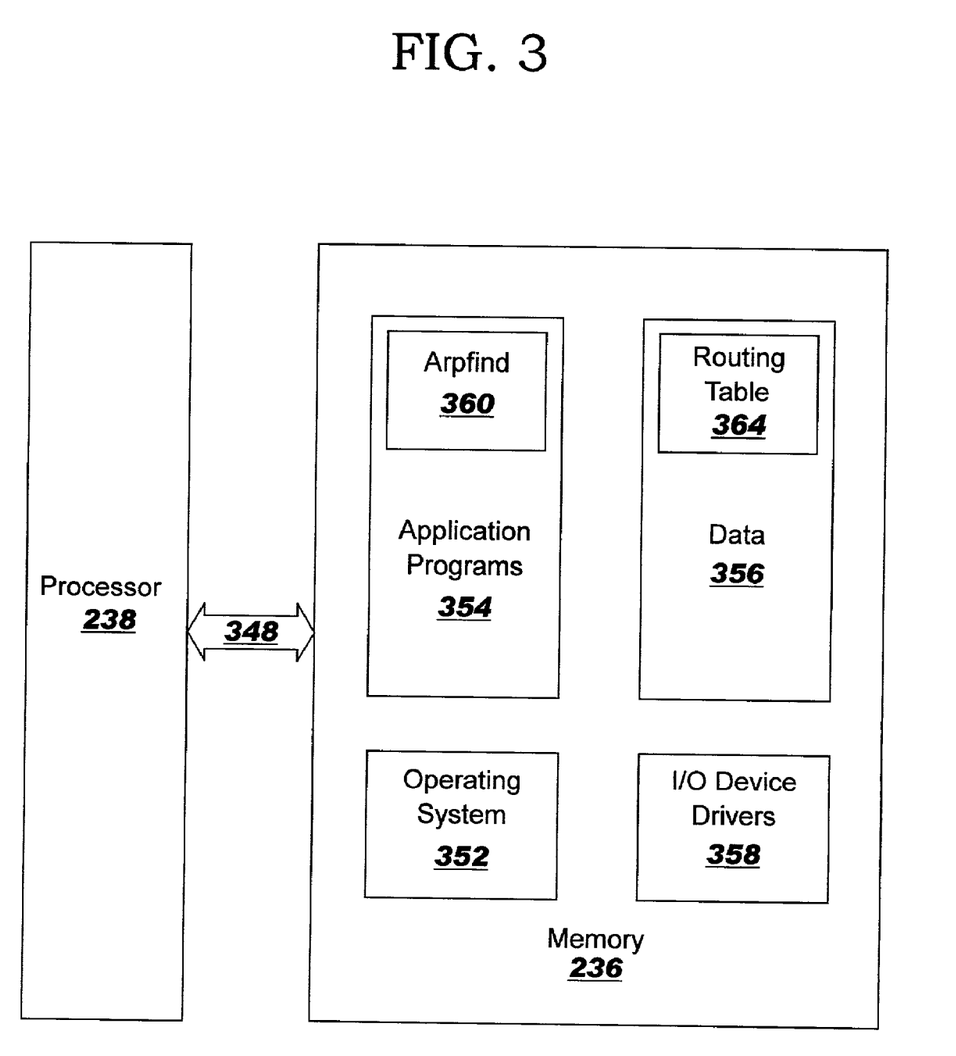
FIG. 3 is a more detailed block diagram of a headless data processing systems according to embodiments of the present invention.

FIG. 3 is a block diagram of embodiments of data processing systems that illustrates systems, methods, and computer program products in accordance with embodiments of the present invention. The processor 238 communicates with the memory 236 via an address/data bus 348. The processor 238 can be any commercially available or custom microprocessor. The memory 236 is representative of the overall hierarchy of memory devices containing the software and data used to implement the functionality of the data processing systems 230 or 233. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing systems 230 and/or 233: the operating system 352; the application programs 354; the input/output (I/O) device drivers 358; and the data 356. As will be appreciated by those of skill in the art, the operating system 352 may be any operating system suitable for use with a data processing system, such as OS/2, AIX or System390 from International Business Machines Corporation, Armonk, N.Y., Windows95, Windows98 or Windows2000 from Microsoft Corporation, Redmond, Wash., Unix or Linux configured to support a TCP/IP-based protocol connection. The I/O device drivers 358 typically include software routines accessed through the operating system 352 by the application programs 354 to communicate with devices such as the I/O data port(s) 246, the data storage 235 and certain memory 236 components. The application programs 354 are illustrative of the programs that implement the various features of the data processing systems 230 and/or 233 and preferably include at least one application which supports operations according to embodiments of the present invention. Finally, the data 356 represents the static and dynamic data used by the application programs 354, the operating system 352, the I/O device drivers 358, and other software programs that may reside in the memory 236.

As is further seen in FIG. 3, the application programs 354 may include an ARPfind module 360. The ARPfind module 360 carries out operations as described herein related to establishing a connection with a configuring device so as to allow configuration of the headless data processing system 233. The ARPfind module 360 may operate in coordination with the operating system 352 and the I/O device drivers 358 to support establishing a connection through the I/O data ports 246 prior to the headless data processing system 233 being configured with a network address and/or a routing table.

The data portion 356 of memory 236, as shown in the embodiments of FIG. 3, includes a routing table 364. The routing table 364, in various embodiments of the present invention, represents the routing paths for packets to be transmitted by the headless data processing system 233 and may be initially empty. As described below, in certain embodiments of the present invention, an ARP Request list may also be provided in the data portion 356 of the memory 236. Such an ARP Request list may include a list of candidate network addresses which are being evaluated to determine if the network address is an unassigned address.

While the present invention is illustrated, for example, with reference to the ARPfind module 360 being an application program in FIG. 3, as will be appreciated by those of skill in the art, other configurations may also be utilized while still benefitting from the teachings of the present invention. For example, the ARPfind module 362 may also be incorporated into the operating system 352, the I/O device drivers 358 or other such logical division of the data processing system 233. Thus, the present invention should not be construed as limited to the configuration of FIG. 3 but is intended to encompass any configuration capable of carrying out the operations described herein.

Operations according to embodiments of the present invention, including the configuring device 10, the routers 14 and 18 and the headless device 22 having an ARPfind module 360, will now be described with reference to the exemplary network diagram of FIG. 1 and the flowchart of FIG. 4. However, as will be appreciated by those of skill in the art, the network illustrated in FIG. 1 is exemplary only. Embodiments of the present invention may be utilized in other network configurations.

Figure 4:
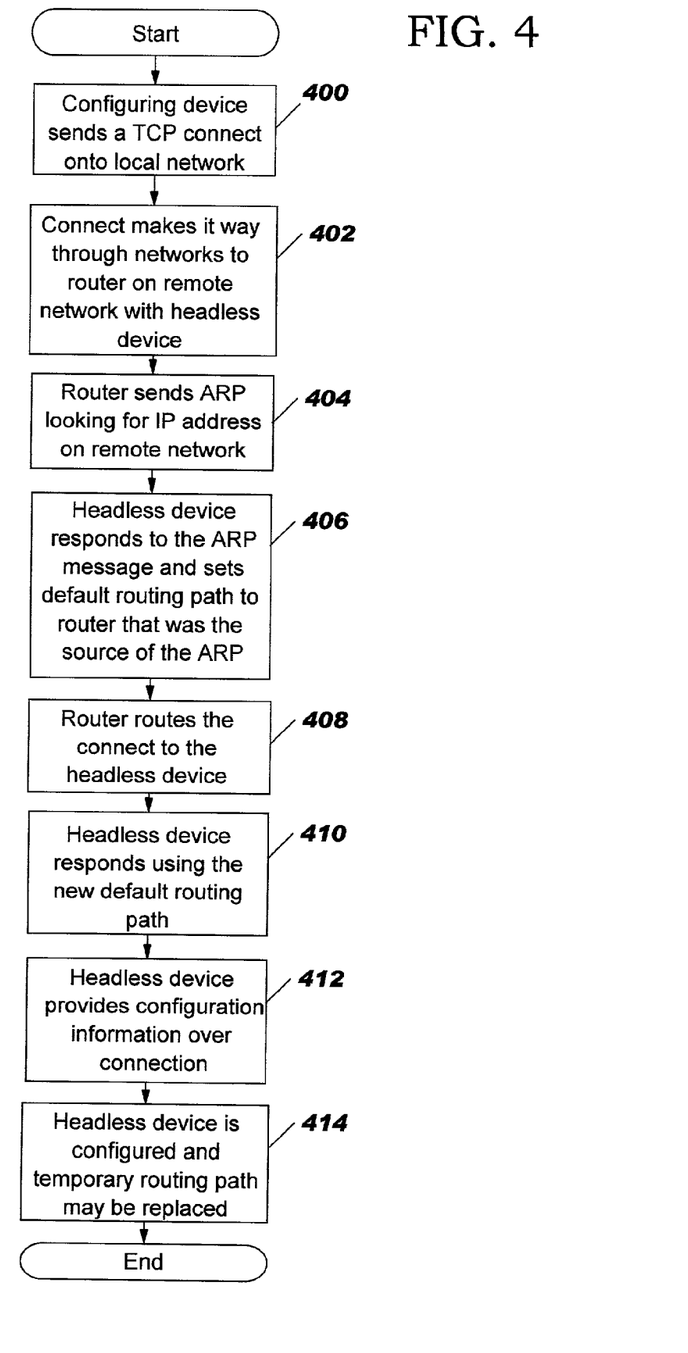
FIG. 4 is a flowchart illustrating operations according to embodiments of the present invention.

As seen in FIG. 4, the configuring device 10 initiates, on its local network 12, a connection request, which includes a target network address, such as an IP address, where the target network address is an unassigned network address on the network 20 of the headless network device 22 (block 400). Such a connection request may be initiated, for example, by entering http://IP_address:port_num in a web browser to point the web browser to the IP address of "IP_address" and the port_num is a predefined port, such as 3939. The connection request makes its way through the router 14, to the network 16, to the router 18, and onto the network 20 associated with the headless device 22 via conventional routing techniques (block 402). In response to receiving the connection request to the unassigned network address, the router 18 sends an Address Resolution Protocol (ARP) message onto the network 20 containing the target network address of the connection request and looking for a device which responds to the ARP message (block 404).

Because the ARP message from the router 18 is to a network address which has not been assigned, the headless device 22 responds to the ARP message to take ownership of the network address which is being ARP'ed (i.e. the network address specified in the connection request which generated the ARP message) and sets a default routing path to a network address contained in the ARP message which identifies the source of the ARP message (e.g. the network address of the router 18) in the routing table 364 (block 406). Upon receiving the response to the ARP message, the router 18 routes the connection request to the headless device 22 over the network 20 (block 408). Upon receiving the connection request, the headless device 22 responds to the connection request using the default routing path (block 410). Thus, the headless device 22 sends the response to the connection request over the network 20 to the router 18 which sends the response over the network 16 to the router 14 which, in turn, sends the response to the configuring device 10 to establish the connection between the configuring device 10 and the headless device 22.

Once the connection between the headless network device 22 and the configuring device 10 is established, the headless device may provide configuration information, such as configuration screens which may, for example, be web pages or the like, to the configuring device 10 over the established connection or a subsequent connection (block 412). The headless network device 22 may be configured by the configuring device 10, which may include replacing the temporary default routing path or even the network address assumed by the headless network device 22 (block 414).

Figure 5:
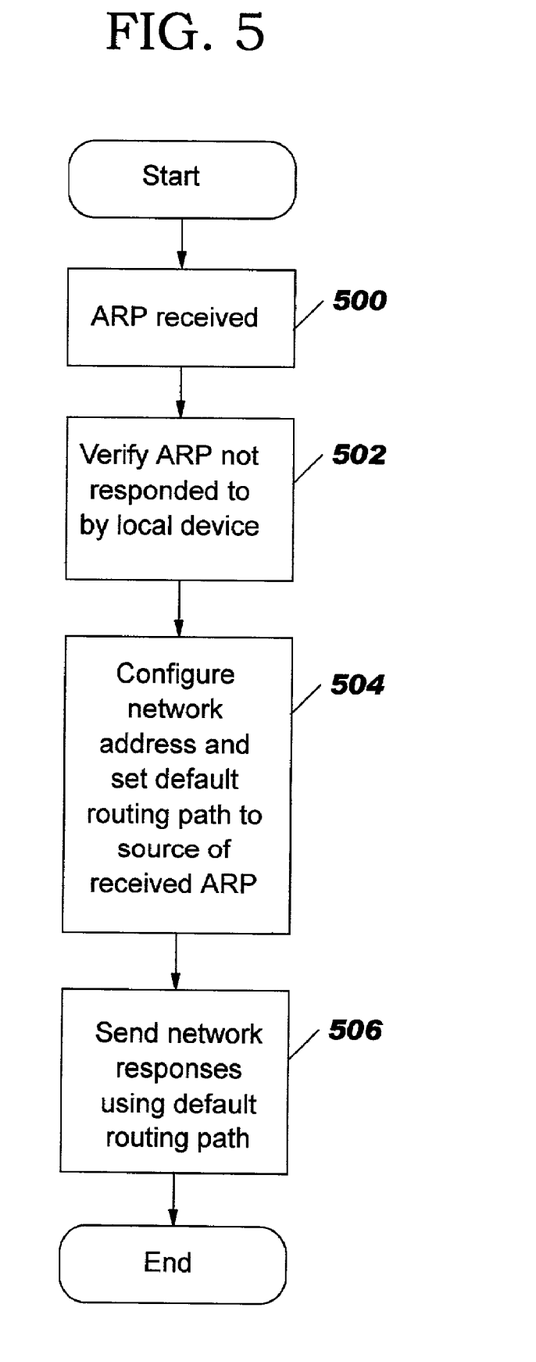
FIG. 5 is a flowchart illustrating operations of a network device according to embodiments of the present invention.

FIG. 5 illustrates operations for establishing a network address of a network device which has not been assigned a network address according to further embodiments of the present invention. As seen in FIG. 5, a network device receives an ARP message having an associated network address (block 500). The ARP message is an ARP message which specifies that a device which has been assigned the associated network address will respond to the ARP message with another ARP message. The network device verifies that the ARP message has not been responded to by another network device (block 502). If the ARP message was not responded to by another network device, the network device configures the network address associated with the ARP message as its own network address, including, for example, by responding to the ARP message, and sets a source network address which is also included in the received ARP message as a destination address for a default routing path of the network device (block 504). The network device then utilizes the default routing path to respond to network messages to the network device (block 506).

Figure 6:
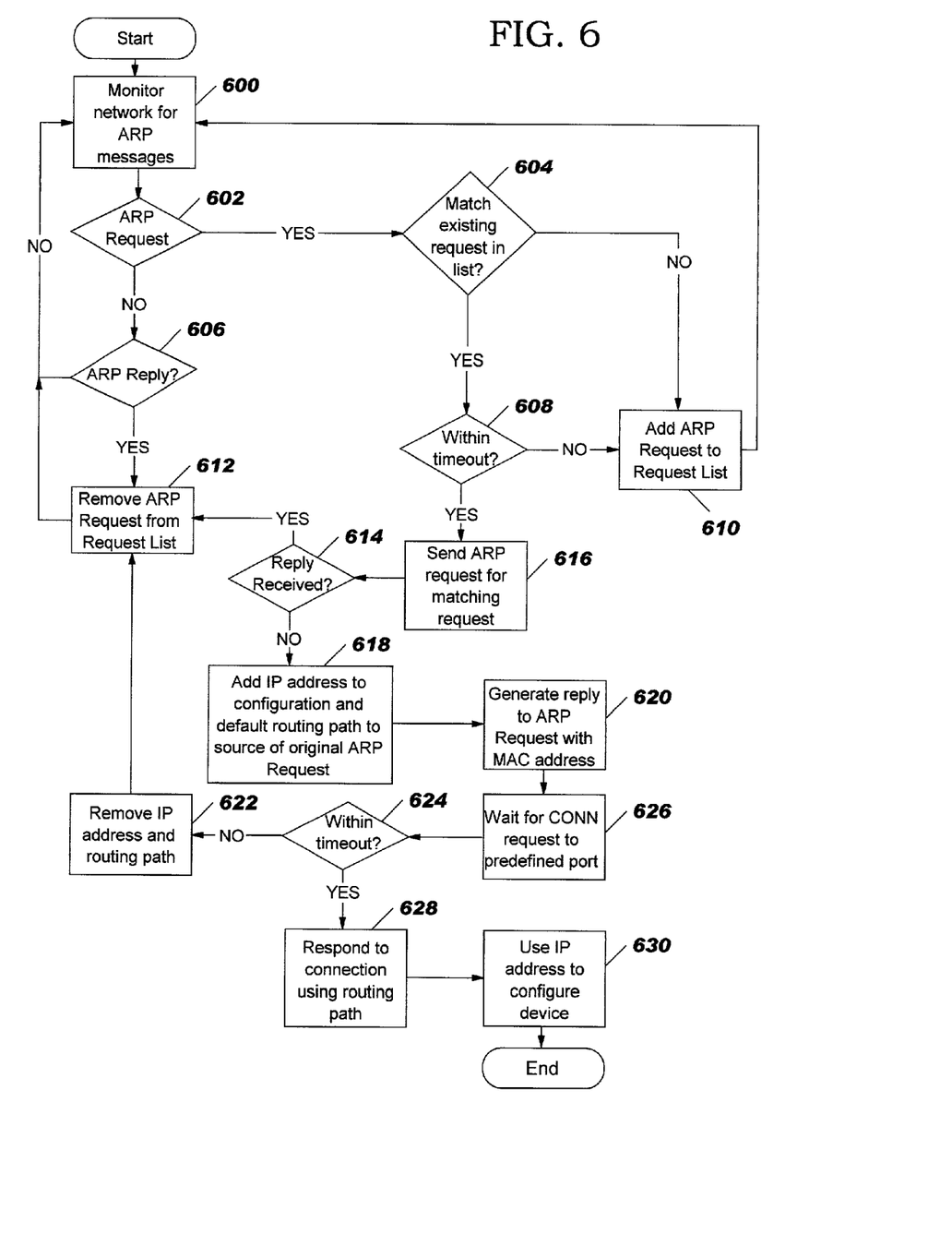
FIG. 6 is a more detailed flowchart illustrating operations of a network device according to further embodiments of the present invention.
Figure 7:
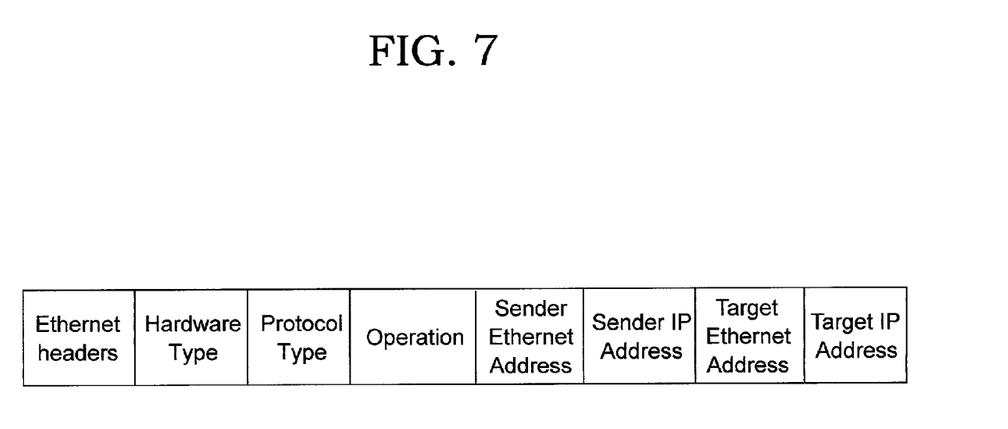
FIG. 7 is an illustration of an Address Resolution Protocol request packet.

FIG. 6 illustrates further embodiments of the present invention where a network device uses ARP requests and replies to such requests to assign itself an IP address. As seen in FIG. 6, the network device monitors its local network for ARP messages (block 600). When an ARP message is received it is determined if the received message is an ARP request (block 602). The format of an ARP request is illustrated in FIG. 7 and includes the sender's IP address, which is the IP address of the source of the ARP request, and a target IP address, which is the IP address of a device which is to respond to the ARP request if the target IP address is assigned to a device.

If the message is an ARP request (block 602), the received ARP request is compared to a list of previously received ARP requests (block 604) (e.g. the ARP request list). If the received request matches a request in the list of requests (e.g. has the same protocol type, sender IP address, target IP address, etc.), it is determined if the ARP request was received within a predefined timeout period since the ARP request was received which generated the entry in the list of requests (block 608). If either the received ARP request does not match an entry in the list of ARP requests (block 604) or the ARP request matches but was not received in the timeout period (block 608), the ARP request is added to the list of requests (block 610). Such an addition to the list of requests may take the form of adding a new entry to the list or updating an existing entry to reflect when the ARP request was received. In either case, the network device returns to monitoring the network for ARP messages (block 600).

If the received ARP message is not an ARP request (block 602), it is determined if the ARP message is a reply to an ARP request (block 606). If the message is a reply (block 606), the entry for the ARP request corresponding to the reply is removed from the list of requests (block 612) and the network device returns to monitoring the network for ARP messages (block 600). If the ARP message is not a reply (block 606), the network device returns to monitoring the network for ARP messages (block 600).

If the received ARP request matches an entry in the list of requests (block 604) and is received within the timeout period (block 608), the network device sends its own ARP request for the target IP address specified in the received ARP request onto the network (block 616). The network device waits a predefined time for a reply to its ARP request. If a reply is received (block 614), then the target IP address has already been assigned to another device and the entry corresponding to the received ARP request is removed from the list of requests (block 612). The network device then returns to monitoring the network for ARP messages (block 600).

If no reply is received to the ARP request in the predefined time for a reply (block 614), then the target IP address is unassigned and the network device adds the target IP address of the received ARP request to its configuration and sets its default routing path to the source address of the received ARP request (block 618). The network device also generates a reply to the received ARP request which identifies its Media Access Controller (MAC) address to the sender of the received ARP request (block 620).

The network device also waits for a connection request on a predefined port, such as port 3939, (block 626). If such a connection request is not received within a predefined timeout period (block 624), the network device removes the target IP address and routing path from its configuration (block 622) and removes the entry corresponding to the received ARP request from the list of requests (block 612). The network device then returns to monitoring the network for ARP messages (block 600). If a connection request to the predefined port is received within the predefined timeout period (block 624), the network device responds to the connection request using the default routing path (block 628) and uses the IP address to configure the device (block 630).

The flowcharts and block diagrams of FIGS. 1 through 6 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

While the present invention has been described primarily with reference to headless network devices, as will be appreciated by those of skill in the art, the present invention may be utilized with any network device capable of carrying out the operations described herein. Thus, for example, the present invention may be utilized for remote configuration of network devices which are attached to remote networks irrespective of whether the network device is headless.

In the drawings and specification, there have been disclosed typical illustrative embodiments of the invention and, although specific terms are employed, they are used in a generic and descriptive sense only and not for purposes of limitation, the scope of the invention being set forth in the following claims.

What is claimed is:

1. A method of establishing a connection to a network device which does not have an assigned network address, comprising:
   establishing a connection from a configuring device to the network device utilizing an unassigned network address for a network to which the network device is attached irrespective of whether the network device is attached to a network local to or remote from the configuring device;
   wherein establishing a connection to the network device comprises:
   receiving a connection request from a configuring device on a network local to the network device and remote from the configuring device, wherein the connection request includes the unassigned network address;

sending an Address Resolution Protocol (ARP) message on the remote network responsive to receiving the connection request, the ARP message containing the unassigned network address; and wherein the network device carries out the following:

responding to the ARP message to assume ownership of the unassigned network address;

evaluating the received ARP message to determine a source address for the ARP message;

setting a default routing path for messages to networks other than the remote network to the source address for the ARP message;

receiving the connection request; and responding to the connection request using the default routing path so as to establish the connection utilizing the assumed unassigned network address.

2. The method of claim 1, wherein responding to the ARP message is preceded by determining if another device attached to the remote network has responded to the ARP message; and wherein responding to the ARP message, setting a default routing path, receiving the connection request and responding to the connection request are carried out if another device has not responded to the ARP message.

3. The method of claim 2, wherein determining if another device attached to the remote network has responded to the ARP message comprises monitoring the remote network for ARP message responses from other devices on the remote network.

4. The method of claim 3, wherein determining if another device attached to the remote network has responded to the ARP message further comprises:

sending a second ARP message identifying the unassigned network address onto the remote network; and determining if a response to the second ARP message is received.

5. The method of claim 1, further comprising:

evaluating the received connection request to determine if the received connection request is to a predetermined port; and wherein responding to the connection request is not carried out if the connection request is not to the predetermined port.

6. The method of claim 1, wherein configuring the network device includes replacing the default routing path to the source of the ARP message with at least one user configured routing path.

7. The method of claim 1, wherein configuring the network device includes assigning a new network address to the network device which is different from the assumed unassigned network address of the connection.

8. A method of assigning a network address to a network device which does not have an assigned network address, comprising:

receiving an Address Resolution Protocol (ARP) message at the network device, the ARP message specifying a target network address;

determining if target network address of the received ARP message is an unassigned network address;

responding to the received ARP message so as to assume ownership of the target network address if the target network address is an unassigned network address; and setting a default routing path of the network device to a source address of the received ARP message such that communications to devices which are in a network remote from the network associated with the network device are sent to the source address.

9. The method of claim 8, further comprising:

receiving a connection request to the target network address and to a predefined port;

responding to the connection request utilizing the default routing path so as to establish a connection to the network device.

10. The method of claim 9, wherein the connection is established between the network device and a configuring device, the method further comprising configuring the network device utilizing the established connection.

11. The method of claim 10, wherein configuring the network device comprises assigning a new network address to the network device.

12. The method of claim 10, wherein configuring the network device comprises providing updated routing information to the network device to replace the default routing path of the network device.

13. The method of claim 8, wherein determining if a target network address of the received ARP message is an unassigned network address comprises:

sending an ARP message from the network device which identifies the target network address; and determining that the target network address is not an unassigned network address if a response to the ARP message from the network device is received within a predefined time period.

14. The method of claim 8, wherein the target network address comprises an Internet Protocol address and the ARP message comprises an ARP request.

15. The method of claim 14, wherein setting a default routing path of the network device to a source address of the received ARP message such that communications to devices which are in a network remote from the network associated with the network device are sent to the source address comprises setting the default routing path for destination devices associated with an IP subnet which is different from an IP subnet associated with the network device to a sender IP address of the ARP request received by the network device.

16. The method of claim 8, wherein the network device comprises a headless network device.

17. A computer program product for assigning a network address to a network device which does not have an assigned network address, comprising:

computer-readable program code embodied in a computer-readable storage media, the computer-readable program code comprising:

computer-readable program code which receives an Address Resolution Protocol (ARP) message at the network device, the ARP message specifying a target network address;

computer-readable program code which determines if target network address of the received ARP message is an unassigned network address;

computer-readable program code which responds to the received ARP message so as to assume ownership of the target network address if the target network address is an unassigned network address; and computer-readable program code which sets a default routing path of the network device to a source address of the received ARP message such that communications to devices which are in a network remote from the network associated with the network device are sent to the source address.

* * * * *